United States Patent
Shiraki

(10) Patent No.: US 9,712,430 B2
(45) Date of Patent: Jul. 18, 2017

(54) RELAY APPARATUS AND CONTROL METHOD

(75) Inventor: Osamu Shiraki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 586 days.

(21) Appl. No.: 13/596,165

(22) Filed: Aug. 28, 2012

(65) Prior Publication Data

US 2013/0094513 A1 Apr. 18, 2013

(30) Foreign Application Priority Data

Oct. 12, 2011 (JP) .................................. 2011-224674

(51) Int. Cl.
*H04L 12/28* (2006.01)
*H04L 12/721* (2013.01)
*H04L 12/935* (2013.01)

(52) U.S. Cl.
CPC .......... *H04L 45/38* (2013.01); *H04L 49/3009* (2013.01)

(58) Field of Classification Search
CPC ... H04L 12/4641; H04L 49/354; H04L 69/22; H04L 43/026; H04L 47/2441; H04L 49/503; H04L 45/38; H04L 29/12377; H04L 49/3009
USPC ........... 370/395.53, 458, 392, 419, 389, 252
See application file for complete search history.

(56) References Cited

U.S. PATENT DOCUMENTS

| | | | |
|---|---|---|---|
| 2003/0128717 A1* | 7/2003 | Johnson et al. ............... | 370/458 |
| 2005/0220096 A1* | 10/2005 | Friskney ............. | H04L 12/4645 370/389 |
| 2007/0230469 A1* | 10/2007 | Teshima ......................... | 370/392 |
| 2008/0285555 A1* | 11/2008 | Ogasahara ..................... | 370/389 |
| 2009/0213866 A1* | 8/2009 | Eicker et al. .................. | 370/419 |
| 2010/0284410 A1* | 11/2010 | Nakagawa ............ | H04L 12/467 370/395.53 |
| 2012/0314605 A1* | 12/2012 | Akiyoshi ................ | H04L 45/30 370/252 |

FOREIGN PATENT DOCUMENTS

| | | | | |
|---|---|---|---|---|
| JP | 2008-546332 | | 12/2008 | |
| JP | 2010-263507 A | | 11/2010 | |
| JP | WO 2011108205 A1 * | 9/2011 | ............. | H04L 45/30 |

OTHER PUBLICATIONS

Japanese Office Action dated Dec. 16, 2014 in corresponding Japanese Patent Application No. 2011-224674 (2 pages) (2 pages English Translation).

* cited by examiner

*Primary Examiner* — Wei Zhao
*Assistant Examiner* — Lionel Preval
(74) *Attorney, Agent, or Firm* — Staas & Halsey LLP

(57) ABSTRACT

A relay apparatus includes a first data storage unit and a processor. The first data storage unit stores an output port identifier in connection with a combination of a port identifier and a communication type identifier. The processor obtains, when a frame is received, a first output port identifier corresponding to a combination of a port identifier of a port that received the frame and a communication type identifier included in the received frame by use of the first data storage unit to output the received frame to a port identified by the first output port identifier.

5 Claims, 14 Drawing Sheets

FIG. 3

| DESTINATION MAC ADDRESS | VLAN | TRANSMISSION PORT |
|---|---|---|
| 00--1A-2B-3C- | 100 | 1 |
| 00-4D--5E--6P | 200 | 2 |
| 00-7G-8H---9I | 100 | 3 |
| ⋮ | ⋮ | ⋮ |

FIG. 4

| RECEPTION PORT | VLAN | TRANSMISSION PORT |
|---|---|---|
| 1 | 100 | 19 |
| 1 | 200 | 20 |
| 2 | 100 | 19 |
| ⋮ | ⋮ | ⋮ |

FIG. 8

| RECEPTION PORT | PRIORITY | TRANSMISSION PORT |
|---|---|---|
| 1 | 0 | 19 |
| 1 | 3 | 20 |
| 1 | 4 | 20 |
| ⋮ | ⋮ | ⋮ |

FIG. 9

| RECEPTION PORT | PRIORITY GROUP | TRANSMISSION PORT |
|---|---|---|
| 1 | 0 | 20 |
| 2 | 0 | 20 |
| 1 | 1 | 19 |
| ⋮ | ⋮ | ⋮ |

FIG. 10

| RECEPTION PORT | TOS | TRANSMISSION PORT |
|---|---|---|
| 1 | 5 | 19 |
| 2 | 36 | 20 |
| 3 | 37 | 20 |
| ⋮ | ⋮ | ⋮ |

FIG. 11

| RECEPTION PORT | COMMUNICATION PROTOCOL | TRANSMISSION PORT |
|---|---|---|
| 1 | TCP | 19 |
| 1 | UDP | 20 |
| 2 | TCP | 19 |
| ⋮ | ⋮ | ⋮ |

FIG. 12

| RECEPTION PORT | SOURCE MAC ADDRESS | TRANSMISSION PORT |
|---|---|---|
| 3 | 01---1A-2B-3C | 22 |
| 3 | 01-4D---5E-6F | 22 |
| 3 | 01--7G-8H-9I- | 22 |
| ⋮ | ⋮ | ⋮ |

FIG. 13

| RECEPTION PORT | SOURCE IP ADDRESS | TRANSMISSION PORT |
|---|---|---|
| 3 | 192.168.***.0 | 21 |
| 4 | 192.168.***.1 | 22 |
| 4 | 192.168.***.2 | 21 |
| ⋮ | ⋮ | ⋮ |

RELAY APPARATUS AND CONTROL METHOD

CROSS-REFERENCE TO RELATED APPLICATION

This application is based upon and claims the benefit of priority of the prior Japanese Patent Application No. 2011-224674, filed on Oct. 12, 2011, the entire contents of which are incorporated herein by reference.

FIELD

The embodiment discussed herein is related to a relay apparatus.

BACKGROUND

When a looped path is created in a network such as Ethernet (registered trademark), drawbacks such as a broadcast storm may occur.

To deal with a network loop, there is a technology known as Spanning Tree Protocol. Spanning Tree Protocol is a technology that logically cuts a loop by disabling some of links in a network. However, Spanning Tree Protocol has its own drawback such that a detection error may occur when a control frame for detecting a loop is lost. Furthermore, since Spanning Tree Protocol disables some of links in the network, there is a drawback such that the band of the disabled link becomes unavailable.

There is another technology known as a link aggregation. In the link aggregation, a plurality of links are collectively treated as a single logical link. For example, even when a physical loop is created by connecting two switches with a plurality of links, the plurality of links are treated as a single link. Thus, logically, no loop exists, and frames would not travel back and forth between the switches. However, the link aggregation has a drawback such that appropriate use of the plurality of links may become a difficult task, and sometime load may concentrate in a certain link. Furthermore, when a new switch is added to a network and a logical link is set up between the new switch and other existing switch by the link aggregation, there may be a case where new setting is performed on the existing switch. In such a case, unless the existing switch is appropriately set up for the link aggregation, unfavorable side effects may occur in other parts of the network.

Furthermore, there is still another technology known as End Host Mode. In End Host Mode, for example, when a switch is installed between an external network and a plurality of servers, network side ports are set not to forward frames among the network side ports, thereby avoiding a creation of a loop. Furthermore, each of server side ports is associated with one of the network side ports in advance. When a frame is received at one of the server side ports and a transmission port corresponding to a destination is unknown, the frame is output to one of the network side ports, which is associated with the port that received the frame. This enables to deal with the foregoing drawbacks of Spanning Tree Protocol and the link aggregation. However, in End Host Mode, there may be a drawback such that communication paths are mostly fixed since each of the server side ports is associated with one of the network side ports.

Furthermore, with regard to a network switch, there is the following conventional technology. More specifically, a communication system includes a first group of switching units and a second group of switching units, and a network is formed by connecting those switching units. The network is divided into at least two virtual sub-networks, and each of the sub-networks forms a spanning tree. Each of the switching units allocates packets arrived at a certain port to a predetermined virtual sub-network. However, this technology assumes a special system that uses a plurality of switching units, and may not be used to deal with the foregoing drawbacks of End Host Mode.

Japanese National Publication of International Patent Application No. 2008-546332 discloses a related technology.

SUMMARY

According to an aspect of the present invention, provided is a relay apparatus including a first data storage unit and a processor. The first data storage unit stores an output port identifier in connection with a combination of a port identifier and a communication type identifier. The processor obtains, when a frame is received, a first output port identifier corresponding to a combination of a port identifier of a port that received the frame and a communication type identifier included in the received frame by use of the first data storage unit to output the received frame to a port identified by the first output port identifier.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of data stored in a destination DB;

FIG. 4 is a diagram illustrating an example of data stored in a flow DB;

FIG. 8 is a diagram illustrating an example of data stored in a flow DB;

FIG. 9 is a diagram illustrating an example of data stored in a flow DB;

FIG. 10 is a diagram illustrating an example of data stored in a flow DB;

FIG. 11 is a diagram illustrating an example of data stored in a flow DB;

FIG. 12 is a diagram illustrating an example of data stored in a flow DB;

FIG. 13 is a diagram illustrating an example of data stored in a flow DB; and

DESCRIPTION OF EMBODIMENT

Figure 1:
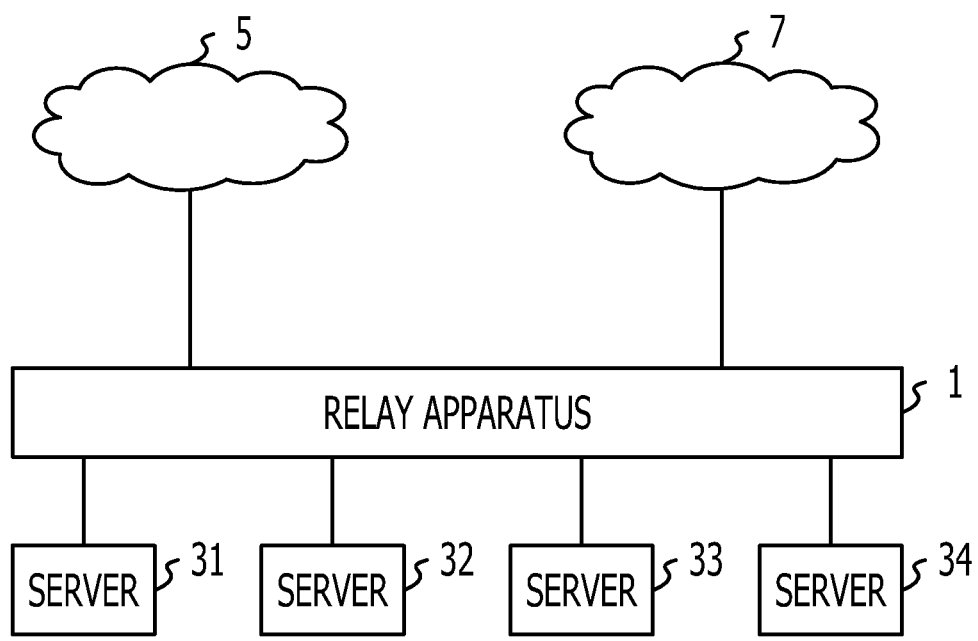
FIG. 1 is a diagram illustrating a system according to an embodiment.

FIG. 1 illustrates a system according to an embodiment. Servers 31-34 are connected to a relay apparatus 1 that may be an Ethernet switch, for example. Furthermore, networks 5 and 7 are connected to the relay apparatus 1. The networks 5 and 7 may be a local area network (LAN) and a storage area network (SAN), for example. In FIG. 1, four servers are illustrated. However, there is no limitation on the number of the servers. Furthermore, there is no limitation on the number of the networks connected to the relay apparatus 1.

Figure 2:
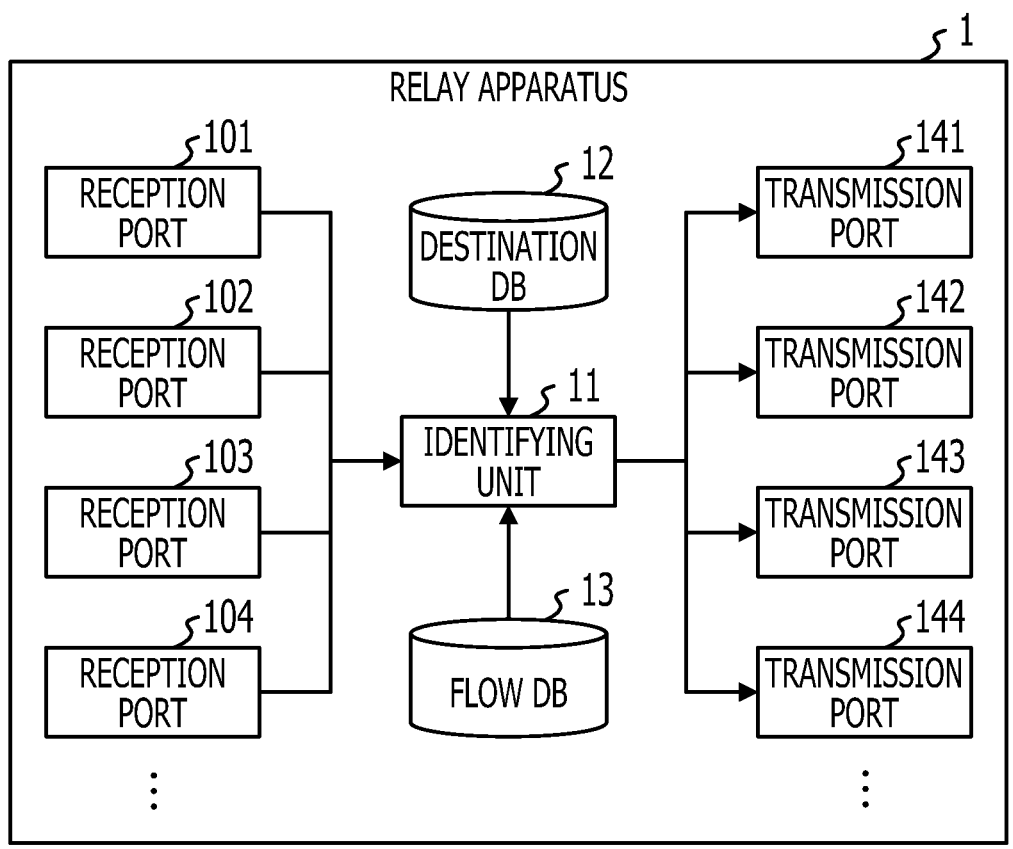
FIG. 2 is a functional block diagram of a relay apparatus.

FIG. 2 illustrates a functional block diagram of the relay apparatus 1. The relay apparatus 1 includes reception ports 101-104, an identifying unit 11, a destination database (DB) 12, a flow DB 13, and transmission ports 141-144. In FIG. 2, the numbers of the reception ports and the transmission ports are each four. However, there is no limitation on those numbers.

When one of the reception ports 101-104 receives a frame, it outputs the received frame to the identifying unit 11. The identifying unit 11 identifies a transmission port to which the frame is to be output based on data stored in the destination DB 12 and the flow DB 13, and outputs the frame to the transmission port thus identified. The transmission ports 141-144 transmit the frame which is input from the identifying unit 11.

FIG. 3 illustrates an example of data stored in the destination DB 12. In the example of FIG. 3, destination media access control (MAC) addresses, virtual LAN (VLAN) identifiers, and transmission port identifiers are stored in the destination DB 12. The VLAN identifier may be VLAN ID, for example.

In the present embodiment, results of a MAC address learning process are stored in the destination DB 12. Note that, although the MAC address learning process is performed on ports (hereinafter, referred to as server side ports) to which the servers 31-34 are connected, no MAC address learning process is performed on ports (hereinafter, referred to as network side ports) to which the networks 5 and 7 are connected.

FIG. 4 illustrates an example of data stored in the flow DB 13. In the example of FIG. 4, reception port identifiers, the VLAN identifiers, and the transmission port identifiers are stored in the flow DB 13. The flow DB 13 stores data for identifying a communication path when one of the servers communicates with a device in the network 5 or 7.

In the present embodiment, the VLAN identifier is used as a flow (namely communication type) identifier. Alternatively, other information may also be used as the flow identifier, as will be described below.

Figure 5:
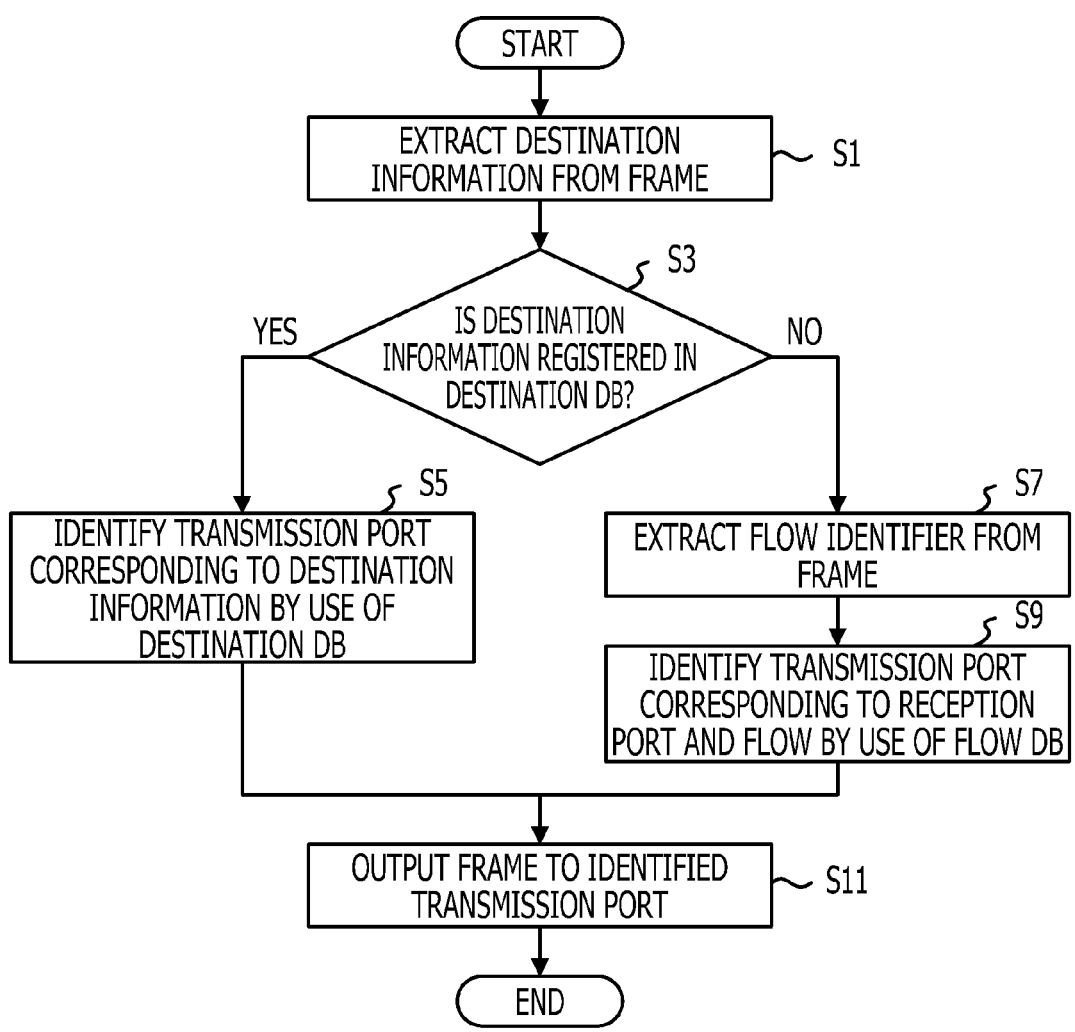
FIG. 5 is a diagram illustrating a process flow of a process performed by a relay apparatus.

Next, operations of the relay apparatus 1 is described with reference to FIG. 5. Here, an example is described for a case where one of the servers 31-34 transmits a frame.

First, one of the reception ports 101-104 receives a frame transmitted from one of the servers 31-34, and outputs the received frame to the identifying unit 11. Subsequently, the identifying unit 11 extracts destination information (the destination MAC address and the VLAN identifier in the present embodiment) from the frame (FIG. 5, S1).

The identifying unit 11 determines whether or not a combination of the destination MAC address and the VLAN identifier thus extracted is registered in the destination DB 12 (S3).

When the combination of the destination MAC address and the VLAN identifier is registered in the destination DB 12 (YES in S3), the identifying unit 11 identifies the transmission port corresponding to the combination of the destination MAC address and the VLAN identifier by use of the destination DB 12 (S5).

On the other hand, when the combination of the destination MAC address and the VLAN identifier is not registered in the destination DB 12 (NO in S3), the identifying unit 11 extracts the flow identifier (the VLAN identifier in the present embodiment) from the frame (S7). Furthermore, the identifying unit 11 identifies the transmission port corresponding to a combination of the VLAN identifier and the reception port identifier of the frame by use of the flow DB 13 (S9).

Subsequently, the identifying unit 11 outputs the frame to the transmission port thus identified in S5 or S9 (S11). This ends the process.

The above process may provide flexibility in output port switching in accordance with the flow of the received frame. In other words, frames received at one port may not be destined to a single predetermined output port as in the case of End Host Mode.

Furthermore, load concentration at particular ports may be alleviated by suitably setting the flow DB 13.

The example described above is configured such that entries with regard to the server side ports are stored in the destination DB 12. Accordingly, communications among the servers are achieved by use of the destination DB 12. On the other hand, no entry with regard to the network side ports is stored in the destination DB 12. Accordingly, communications from one of the servers 31-34 to a device in the network 5 or 7 are achieved by use of the flow DB 13.

The example discussed above considers a case where one of the servers 31-34 transmits a frame. A case where a device in the network 5 or 7 transmits a frame is described below. First, when a device in the network 5 transmits a frame to a device in the network 7 (or vice versa), the frame is discarded by the relay apparatus 1. This is because the destination DB 12 stores no entry with regard to the network side port, and furthermore the flow DB 13 stores no data to identify a communication path when a device in the network 5 communicates with a device in the network 7. On the other hand, when a device in the network 5 (or network 7) transmits a frame to a server, the frame is properly relayed. This is because the destination DB 12 stores entries with regard to the server side ports, making it possible to identify the output port by use of the destination DB 12. Furthermore, a communication path may also be identified by use of the flow DB 13 when the flow DB 13 stores data that enable to identify the communication path.

Figure 6:
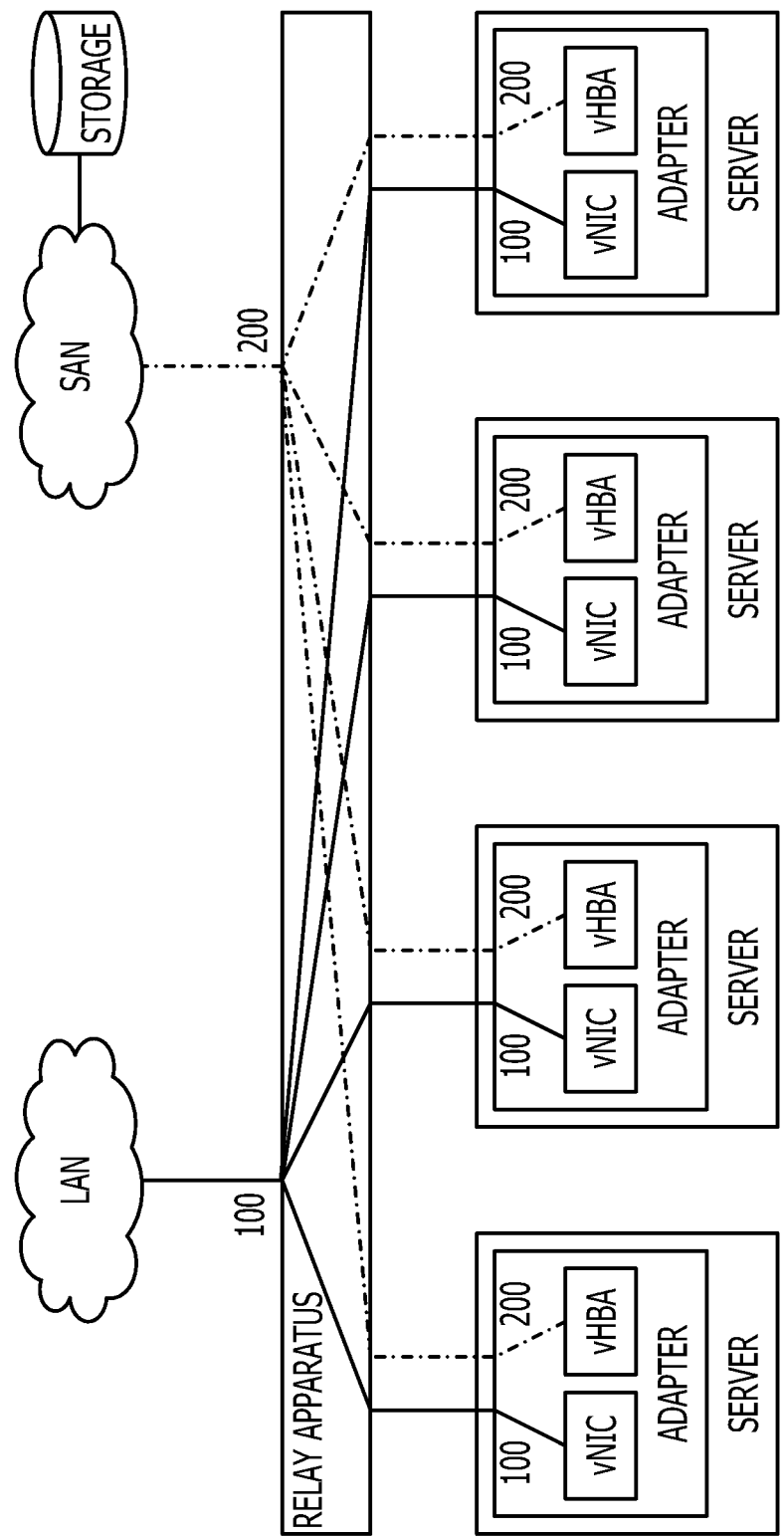
FIG. 6 is a diagram illustrating an application example of an embodiment.

FIG. 6 illustrates an application example of the present embodiment described above. In FIG. 6, four servers are connected to the relay apparatus according to the present embodiment. Furthermore, a LAN and a SAN are connected to the relay apparatus. Each of the servers includes a vNIC that is a virtually configured network interface card (NIC) and a vHBA that is a virtually configured host bus adapter (HBA).

The relay apparatus identifies a flow of a frame received from a server by use of the VLAN ID and relays the frame in accordance with the flow. In the example of FIG. 6, a frame with the VLAN ID of 100—namely a frame transmitted from the vNIC in the server—is output to a port for relaying a frame to the LAN. Furthermore, a frame with the VLAN ID of 200—namely a frame transmitted from the vHBA in the server—is output to a port for relaying a frame to the SAN.

Frames may be distributed appropriately according to their respective flows by configuring in such a way that frames received at different reception ports are all output to the same transmission port as long as the frames share the same flow as in the example of FIG. 6.

Figure 7:
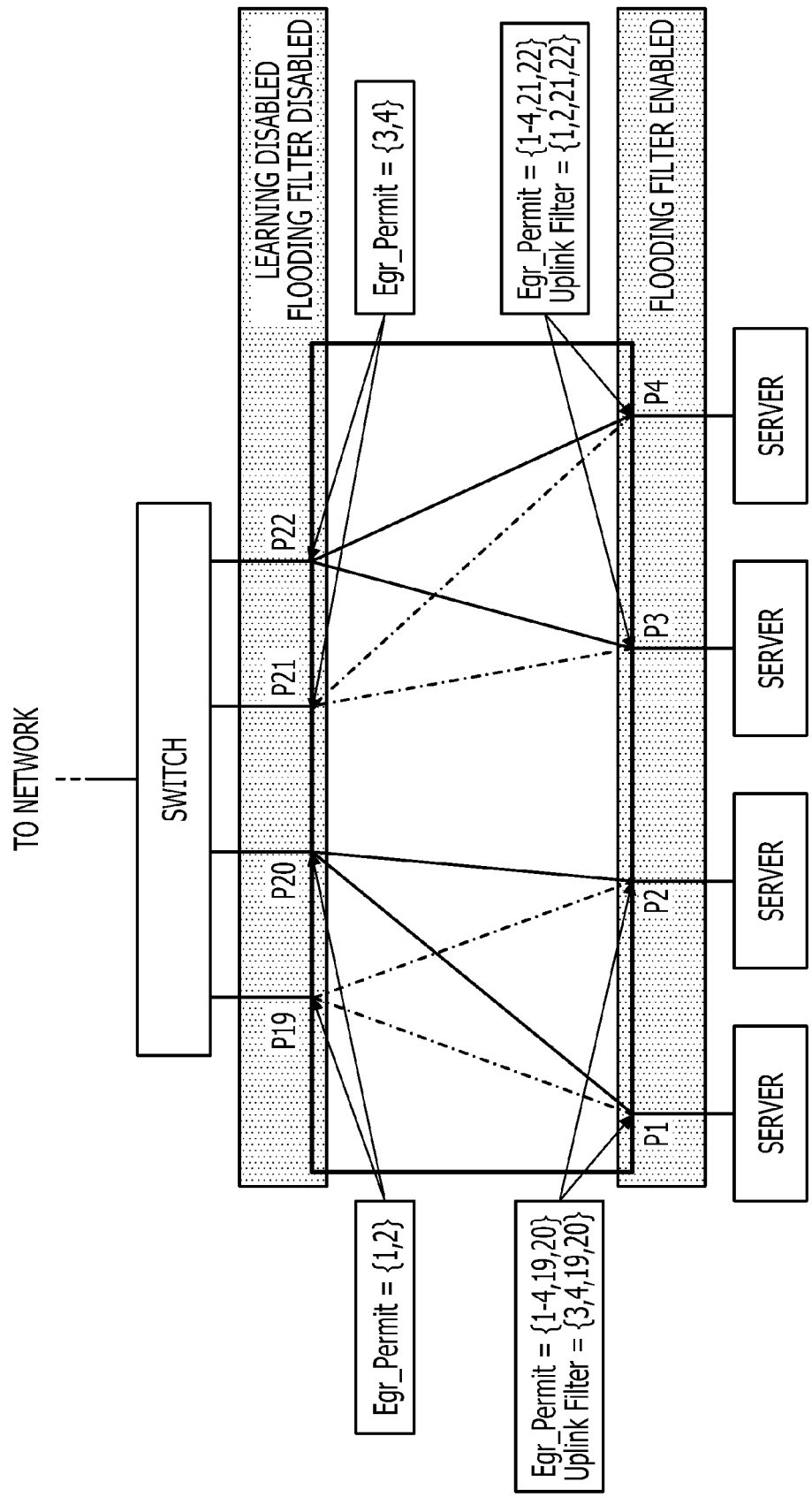
FIG. 7 is a diagram illustrating an example of setting in a relay apparatus according to an embodiment.

FIG. 7 illustrates an example of setting in a relay apparatus according to the present embodiment. In FIG. 7, four servers are connected to the relay apparatus according to the present embodiment via ports P1-P4. Furthermore, a single switch is connected to the relay apparatus according to the present embodiment via ports P19-P22. A frame input through the port P1 is output to the port P19 or P20 depending on its flow. A frame input through the port P2 is output to the port P19 or P20 depending on its flow. A frame input through the port P3 is output to the port P21 or P22 depending on its flow. A frame input through the port P4 is output to the port P21 or P22 depending on its flow.

Furthermore, the system illustrated in FIG. 7 has the following additional setting. First, in this setting, no MAC address learning process is performed with regard to the ports P19-P22 (referred to as switch side ports). This setting corresponds to the part "LEARNING DISABLED" in FIG. 7.

Furthermore, the ports P19 and P20 are set to pass only frames to the port P1 or P2. This setting corresponds to the part "Egr_Permit={1, 2}" in FIG. 7. Furthermore, the ports P21 and P22 are set to pass only frames to the port P3 or P4. This setting corresponds to the part "Egr_Permit={3, 4}" in FIG. 7.

Furthermore, the ports P19-P22 are set not to filter flooding of unknown destination unicast frames. This setting corresponds to the part "FLOODING FILTER DISABLED" in FIG. 7.

On the other hand, the ports P1-P4 (server side ports) have the following setting.

First, the ports P1 and P2 are set to pass only frames to the port P1-P4, P19 or P20. Furthermore, the ports P3 and P4 are set to pass only frames to the port P1-P4, P21 or P22. Those settings correspond to the parts "Egr_Permit={1-4, 19, 20}" and "Egr_Permit={1-4, 21, 22}" in FIG. 7, respectively.

Furthermore, the ports P1 and P2 are set not to transmit broadcast and unknown destination unicast frames from the port P3, P4, P19, or P20. This setting corresponds to the part "Uplink_Filter={3, 4, 19, 20}" in FIG. 7. Furthermore, the ports P3 and P4 are set not to transmit broadcast and unknown destination unicast frames from the port P1, P2, P21, or P22. This setting corresponds to the part "Uplink_Filter={1, 2, 21, 22}" in FIG. 7.

Furthermore, the ports P1-P4 are set to filter flooding of unknown destination unicast frames. This setting corresponds to the part "FLOODING FILTER ENABLED" in FIG. 7.

According to the settings described above, a frame transmitted from one of the servers to another server is not output to the switch side port. On the other hand, a frame transmitted from one of the servers to a device in an external network is output to an appropriate port according to a flow of the frame.

Furthermore, according to the above settings, no communication may be performed among the switch side ports. Thus, endless forwarding of frames in a looped path formed between a relay apparatus and a switch may be avoided.

One embodiment is described above. However, embodiments are not limited only to the above embodiment. For example, the functional block diagram of the relay apparatus described above does not necessarily correspond to an actual program module configuration.

Each of the tables described above is only an example, and may have a different structure. Furthermore, in the process flow of FIG. 5, the order of operations may be changed, provided that the same process results are obtained. Furthermore, some of the operations may be performed in parallel.

In the foregoing example, the destination MAC address and the VLAN identifier are used as the destination information. However, other information that enables to identify a destination may alternatively be used.

Furthermore, in the foregoing example, the VLAN identifier is used as the flow identifier. However, other information that enables to classify a frame may alternatively be used.

For example, when priority information is used, data illustrated in FIG. 8 may be registered in the flow DB 13.

When priority group information is used, data illustrated in FIG. 9 may be registered in the flow DB 13, for example.

When type-of-service (TOS) information is used, data illustrated in FIG. 10 may be registered in the flow DB 13, for example.

When communication protocol information is used, data illustrated in FIG. 11 may be registered in the flow DB 13, for example.

When a source MAC address is used, data illustrated in FIG. 12 may be registered in the flow DB 13, for example.

When a source internet protocol (IP) address is used, data illustrated in FIG. 13 may be registered in the flow DB 13, for example.

Alternatively, the flow may be identified by combining a variety of the foregoing information.

Furthermore, an access control list (ACL) may be used to identify the flow. When the ACL is used, the transmission port, to which a received frame is to be output, may be identified by providing parameters such as the reception port identifier, the flow identifier, and information (I2hit) indicating whether or not the transmission port has been identified by destination, for example.

Figure 14:
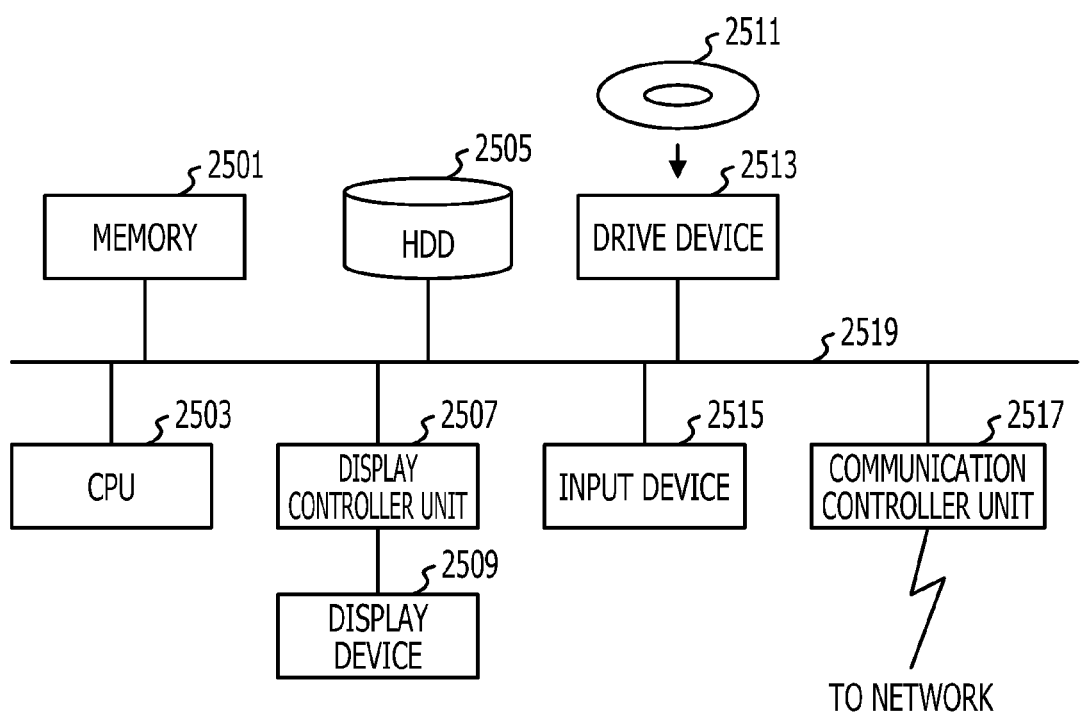
FIG. 14 is a functional block diagram of a computer.

The servers 31-34 are computer apparatuses. As illustrated in FIG. 14, a computer apparatus is configured such that a memory 2501, a central processing unit (CPU) 2503, a hard disk drive (HDD) 2505, a display controller unit 2507 connected to a display device 2509, a drive device 2513 for a removable recording medium 2511, an input device 2515, and a communication controller unit 2517 for connecting to a network are connected through a bus 2519, for example. An operating system (OS) and an application program for executing the process according to the present embodiment are stored in the HDD 2505, and are read out from the HDD 2505 to the memory 2501 when the CPU 2503 executes the OS and application program. By executing the application program, the CPU 2503 controls the display controller unit 2507, the communication controller unit 2517, and the drive device 2513 to cause them to perform predetermined actions. Data produced during the execution of the process is usually stored in the memory 2501. However, such data may alternatively be stored in the HDD 2505. In the present embodiment, the application program for executing the process described above is stored in the computer-readable removable recording medium 2511 for distribution, and installed in the HDD 2505 via the drive device 2513. Alternatively, the application program may be installed in the HDD 2505 via a network such as Internet and the communication controller unit 2517. The computer apparatus described above actualizes the various foregoing functions when the CPU 2503 executes programs such as the OS and the application program stored in a memory device such as the memory 2501.

The above-described embodiment may be summarized as follows:

The relay apparatus according to the present embodiment includes a first data storage unit and an output unit. The first data storage unit stores a port identifier corresponding to each of combinations of a port identifier and a communication type identifier. When the frame is received, the output unit identifies, by use of the first data storage unit, a port corresponding to a combination of a port identifier of a port that received the frame and a communication type identifier included in the received frame, and outputs the frame to the identified port.

The above configuration may provide flexibility in communication path switching in accordance with the communication type of the received frame.

The relay apparatus may further include a second data storage unit that stores a port identifier in connection with destination information. In such a case, the foregoing output unit may determine whether or not the second data storage unit stores the destination information included in a received frame. When it is determined that the second data storage unit stores the destination information included in the received frame, the output unit may identify a port that corresponds to the destination information included in the frame by use of the second data storage unit, and output the frame to the port thus identified. When it is determined that the second data storage unit does not store the destination information included in the received frame, the output unit may identify a port that corresponds to a combination of a port identifier of a port that received the frame and a communication type identifier included in the received frame by use of the first data storage unit. When an output port, to which the received frame is to be output, is identified simply by use of the foregoing combination, there may be some frames that does not reach their destination. Thus, a frame may be relayed properly by identifying the output port by use of the foregoing combination only when the output port of the frame is not identified by use of the destination information.

When a plurality of ports are connected to another single device, a frame received by one of the plurality of ports may be prohibited from being output to another one of the plurality of ports. Thus, endless forwarding of frames in a looped communication path formed between the relay apparatus and the single device may be avoided.

The foregoing communication type identifier may include one of the VLAN identifier, a priority identifier, a priority group identifier, a TOS identifier, a communication protocol identifier, a source MAC address, and a source IP address.

When a VLAN identifier (for example, VLAN ID) is included, a communication path for storage access (for example, Fibre Channel over Ethernet (FCoE)) and a communication path for inter-server communication may be separated from each other, for example. When a priority identifier (for example, information within a VLAN tag) is included, the communication paths for storage access may be separated into communication paths for FCoE and communication paths for internet small computer system interface (iSCSI), for example. When the priority identifier of Ethernet is used, eight types of communication paths may be set. When a TOS identifier is used, more detailed types of communication paths may be set compared to the case of the priority. When a priority group identifier is included, a plurality of communications that have similar characteristics may be output to the same port, for example. When a communication protocol identifier is included, a suitable communication path may be selected in an event where a plurality of communications with different communication systems are supported. For example, when a plurality of communications, such as a transmission control protocol (TCP) and a user datagram protocol (UDP), having different response properties to a frame loss event are supported, a suitable communication path may be selected to forward frames to networks that match characteristics of communications. When a source MAC address or a source IP address is included, frames may be suitably relayed even in a case where a source device is moved due to live migration, etc., for example.

Furthermore, the foregoing destination information may include a destination MAC address and a VLAN identifier. The destination information may be any information as long as the information enables to identify a destination, and may be only a destination MAC address, for example.

In a control method according to the present embodiment, a relay apparatus identifies, upon receiving a frame, a port corresponding to a combination of a port identifier of a port that received the frame and a communication type identifier included in the received frame by use of a data storage unit that stores a port identifier corresponding to each of combinations of a port identifier and a communication type identifier. And then the relay apparatus outputs the frame to the port thus identified.

A program that causes a computer to perform the process according to the foregoing control method may be generated. Furthermore, the program may be stored in, for example, a storage device or a computer-readable recording medium such as a flexible disk, a compact disc read-only memory (CD-ROM), an magneto-optical disc, a semiconductor memory, a hard disk, etc. Intermediate process results may be temporarily stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A relay apparatus including at least one network side port for at least one network and at least one device side port for at least one device for reception and transmission between the at least one network and the at least one device, the relay apparatus comprising:
    a first memory configured to store at least one first correspondence of an output port identifier that identifies a network side transmission port among the at least one network side port to at least one first combination of a port identifier that identifies a device side reception port among the at least one device side port that received a frame among frames from the at least one device and a first communication type identifier of the received frame;
    a second memory configured to store at least one second correspondence of an output port identifier that identifies a device side transmission port among the at least one device side port to at least one second combination of a media access control (MAC) address and a second communication type identifier, the second correspondence being obtained by MAC address learning performed for a frame among the frames received from any of the at least one device side port; and
    a processor coupled to the first and second memories and the processor configured to:

receive a first frame among the frames;
perform the MAC address learning for the first frame when the first frame is received at any of the at least one device side port without performing the MAC address learning for the first frame when the first frame is received at any of the at least one network side port,
obtain, upon a determination of whether a second combination among the at least one second combination is included in the second memory, an output port identifier corresponding to the second combination from the second memory, the second combination being a combination of a destination MAC address included in the first frame and a communication type identifier included in the first frame,
obtain, upon the determination that the second combination is not included in the second memory, an output port identifier corresponding to a first combination among the at least one first combination from the first memory, the first combination being a combination of a port identifier of a reception port at which the first frame is received and the communication type identifier included in the first frame, and
output the first frame to a port identified by the obtained output port identifier.

2. The relay apparatus according to claim 1, wherein a plurality of the network side ports are connected to a first network, and
the processor is configured to
prohibit a frame received by one of the plurality of network side ports from being output to another one of the plurality of network side ports.

3. The relay apparatus according to claim 1, wherein the communication type identifier included in the first frame includes one of a virtual local area network (VLAN) identifier, a priority identifier, a priority group identifier, a type-of-service (TOS) identifier, a communication protocol identifier, a source media access control (MAC) address, and a source internet protocol (IP) address.

4. A control method executed by a relay apparatus for a communication system, the relay apparatus including
at least one network side port for at least one network and at least one device side port for at least one device for reception and transmission between the at least one network and the at least one device,
non-transitory computer readable storage medium to store information and program(s), and
computer hardware configured, including configured by the program(s), to implement a relay process for the communication system,
the control method by the relay apparatus comprising:
storing by the relay apparatus, in a first memory, at least one first correspondence of an output port identifier that identifies a network side transmission port among the at least one network side port to at least one first combination of a port identifier that identifies a device side reception port among the at least one device side port that received a frame among frames from the at least one device and a first communication type identifier of the received frame;
storing, in a second memory, at least one second correspondence of an output port identified that identifies a device side transmission port among the at least one device side port to at least one second combination of a media access control (MAC) address and a second communication type identifier, the second correspondence being obtained by MAC address learning performed for a frame among the frames received from any of the at least one device side port;
receiving a first frame among the frames;
performing the MAC address learning for the first frame when the first frame is received at any of the at least one device side port without performing the MAC address learning for the first frame when the first frame is received at any of the at least one network side port;
obtaining, upon a determination of whether a second combination among the at least one second combination is included in the second memory, an output port identifier corresponding to the second combination from the second memory, the second combination being a combination of a destination MAC address included in the first frame and a communication type identifier included in the first frame;
obtaining, upon the determination that the second combination is not included in the second memory, an output port identifier corresponding to a first combination among the at least one first combination from the first memory, the first combination being a combination of a port identifier of a reception port at which the first frame is received and the communication type identifier included in the first frame; and
outputting the first frame to a port identified by the obtained output port identifier.

5. A non-transitory computer-readable recording medium storing information and program(s) that causes a relay apparatus for a communication system, the relay apparatus including
at least one network side port for at least one network and at least one device side port for at least one device for reception and transmission between the at least one network and the at least one device, and
computer hardware configured, including configured by the program(s), to implement a relay process for the communication system by executing a procedure, the procedure comprising:
storing, in a first memory, at least one first correspondence of an output port identifier that identifies a network side transmission port among the at least one network side port to at least one first combination of a port identifier that identifies a device side reception port among the at least one device side port that received a frame among frames from the at least one device and a first communication type identifier of the received frame;
storing, in a second memory, at least one second correspondence of an output port identifier that identifies a device side transmission port among the at least one device side port to a combination of a media access control (MAC) address and at least one second communication type identifier, the second correspondence being obtained by MAC address learning performed for a frame among the frames received from any of the at least one device side port;
receiving a first frame among the frames;
performing the MAC address learning for the first frame when the first frame is received at any of the at least one device side port without performing the MAC address learning for the first frame when the first frame is received at any of the at least one network side port;
obtaining, upon a determination of whether a second combination among the at least one second combination is included in the second memory, an output port identifier corresponding to the second combination from the second memory, the second combination being a combination of a destination MAC address included in the first frame and a communication type identifier included in the first frame;

obtaining, upon the determination that the second combination is not included in the second memory, an output port identifier corresponding to a first combination among the at least one first combination from the first memory, the first combination being a combination of a port identifier of a reception port at which the first frame is received and the communication type identifier included in the first frame; and outputting the first frame to a port identified by the obtained output port identifier.

* * * * *